Figures 1, 2:
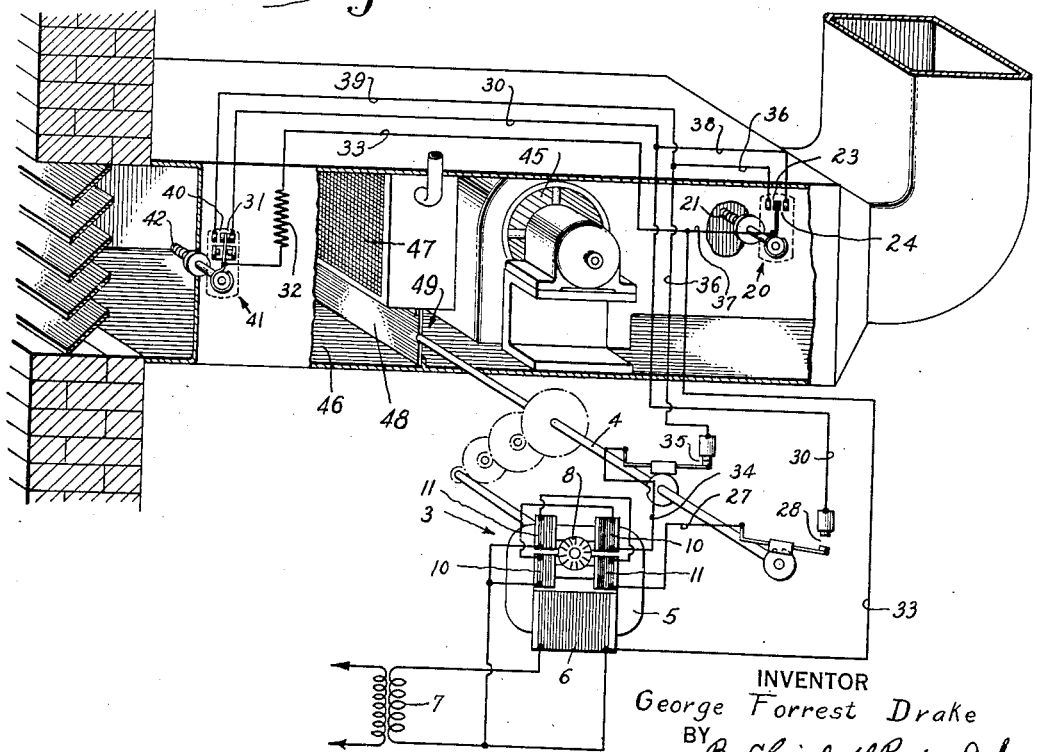

July 4, 1939.  G. F. DRAKE  2,164,312
CONTROL FOR TEMPERATURE REGULATING SYSTEMS AND THE LIKE
Filed Dec. 7, 1934

INVENTOR
George Forrest Drake
BY
ATTORNEYS

Patented July 4, 1939

2,164,312

UNITED STATES PATENT OFFICE 2,164,312

CONTROL FOR TEMPERATURE REGULATING SYSTEMS AND THE LIKE

George Forrest Drake, Rockford, Ill., assignor, by mesne assignments, to Barber-Colman Company, Rockford, Ill., a corporation of Illinois Application December 7, 1934, Serial No. 756,417

15 Claims. (Cl. 236—74)

This invention relates in general to controls for regulating temperature conditions and the like and has more particular reference to systems in which a movable member for regulating a conditioning medium is actuated by a reversible power driven operator.

One object of the invention is to provide a novel control system of the above character in which one or the other of two different conditions may be maintained automatically by one sensitive control instrument.

The invention also resides in the novel character of the mechanism used and the manner of changing the control temperatures selectively.

A further object is to provide a condition control system wherein each of the two switches of a double contact thermostat is utilized to produce a plurality of control motions of a regulating member.

Another object is to provide a novel thermostatic control system by which the temperature of a medium to be controlled may be changed rapidly to a predetermined point and then maintained substantially constant for a time interval.

Other objects and advantages of the invention will become apparent from the following detailed description taken in connection with the accompanying drawing, in which Figures 1 and 2 are schematic views and wiring diagrams of temperature regulating systems embodying the novel features of the present invention.

The invention is susceptible of various modifications and therefore I do not, by the present exemplary disclosure, intend to limit the invention, but aim to cover all modifications and alternatives falling within the spirit and scope of the invention as expressed in the appended claims.

In the exemplary form shown, the invention is embodied in thermostatic controls of the electric type governing the operation of a heat exchanger so as to produce and maintain a substantially constant temperature in a medium the temperature of which is to be controlled. While it is contemplated that the rate of delivery of heat to the medium may be governed in various ways, regulation is effected in the present instance by governing the movement of a device such as a valve member or damper in response to temperature changes detected by thermostatic means.

To render the regulating device controllable conveniently by thermostats, each is arranged to be actuated by a power operator comprising an electric motor 3 preferably of the reversible shaded pole induction type geared to a shaft 4 for operating the regulating device and having a field member 5 with a winding 6 thereon constantly energized from a source 7 of alternating current. The member 5 provides two pole projections defining a cylindrical recess in which is disposed a rotor 8 of the squirrel cage type preferably having inductor bars exposed at the rotor periphery so as to contribute to the lower reactance of the rotor.

Shifting of the magnetic field around the rotor recess in one direction or the other to initiate and maintain rotation of the rotor in corresponding directions is produced by the well known action of shading or short-circuited coils 10 and 11 enclosing side portions of the pole pieces. The coils on corresponding side portions of the respective poles are connected in series relation, and each coil is composed of a relatively large number, approximately 500 turns of No. 34 standard gauge wire in the present instance. With the shading coils thus arranged, the rotor will turn in a clockwise direction when the shading coils 10 are short-circuited or exert the predominating shading effect and in a counterclockwise direction when the coils 11 produce the dominating shading effect.

In the form shown in Fig. 1, the control contemplated by the present invention is utilized to quickly heat a medium to be controlled up to a predetermined temperature and thereafter to maintain such temperature. This is accomplished by initially supplying heat to the medium at a rate substantially higher than that required to maintain the desired temperature in the medium and then, when the temperature of the medium has been raised to a point near that to be maintained, reducing the delivery of heat to a rate such that the desired temperature of the medium may be maintained efficiently. The medium thus controlled may be a body of fluid, such as milk, in a tank 13 containing a heating coil 17 through which heated fluid, such as hot water, may be circulated to impart heat to the milk at a rate determined by the temperature at which the water in the coil 17 is maintained. Herein regulation of the coil temperature is determined by the position of a valve member 14 moved by a cam 15 on the shaft 4 toward and away from a seat in the valve 16. The inlet of the valve is connected to a suitable source of heating fluid generally indicated at 16ª. The fluid circulating system may also include a storage tank 18 and a power driven pump 19.

During the heating up period, the water within the coil 17 is maintained at a relatively high temperature, for example 160 degrees Fahrenheit, and thereafter is maintained at a temperature, for example 144 degrees slightly above that of 140 degrees, which should be maintained in the tank 13. To effect such control, the operation of the motor 3 is governed by a thermostat 20 having a thermostatic member 21 arranged to respond to the temperature of the water delivered to the coil 17 and to actuate a common contact arm 22 of two switches 23 and 24. The contacts 25 and 26 of these switches are spaced apart and so located relative to the arm 22 that the switch 24 will be closed and opened respectively when the temperature of the water in the heating coil 17 is above and below 160 degrees. Similarly, the switch 23 will be closed and opened respectively at temperatures below and above 144 degrees.

When the switch 23 is in active control, the motor 3 is operated in a direction to close the valve when the switch is open and to open the valve when the switch is closed. To this end, a short circuit for the shading coils 11 may be extended through a conductor 27, a switch 28 which is opened by a cam 29 in the limit closed position of the valve member 14, a conductor 30, a switch 31, a resistance element 32, and a conductor 33. The resistance value of the element 32 is such that when the coils 11 are short circuited therethrough, the motor will operate in a direction to close the valve. The circuit for the coils 10 extends through a conductor 34, a switch 35 which is opened in the limit open position of the valve, a conductor 36, the switch 23, a conductor 37, and the conductor 33. Thus, when the switch 23 is closed, both sets of shading coils 10 and 11 will be short circuited, but in view of the lower resistance of the circuit through the coils 10, these coils will exert a predominating shading effect resulting in operation of the motor in a direction to open the valve.

To provide for transferring of the motor control from the switch 23 to the switch 24, a conductor 38 is extended from the contact 25 to the conductor 30, and the conductor 36 is connected by a conductor 39 to the stationary contact of a switch 40. Thus by opening the switch 31 and closing the switch 40, the resistance element 32 is withdrawn from the circuit of the coils 11 and interposed in the circuit through the coils 10. With the switches thus conditioned, the motor will operate in a direction to open the valve when the switch 24 is opened, but will run in a direction to close the valve under the predominating effect of the coils 11 when the switch 24 is closed, as will be the case when the thermostat 20 detects a temperature greater than 160 degrees.

Means is provided for actuating the switches 31 and 40 automatically so as to place one or the other of the switches 23 and 24 in active control of the motor according to the prevailing temperature of the fluid within the tank 13. Herein this means comprises a thermostat 41 having thermostatic element 42 heated by the fluid in the tank 13 and arranged to actuate an arm 43 carrying the common contact of the switches 31 and 40. The thermostat 41 is set so that the switch 40 is opened and the switch 31 closed when a predetermined temperature, for example 140 degrees, has been attained. A magnetic detent or over-center device 44 acting on the arm 43 as an armature may be provided for the purpose of maintaining either one or the other of the switches 31 and 40 closed at all times.

With the control system above described, it will be observed that during initial heating of the fluid within the tank 13, the switch 40 will be closed and the switch 24 thus placed in active control of the motor 3. As a result, the valve member 14 will be moved toward open position while the switch 24 remains open and toward closed position while this switch is closed thereby maintaining the water delivered to the heating coil 17 at approximately 160 degrees so as to effect relative rapid heating of fluid within the tank 13. When the temperature of the fluid has reached 140 degrees, the switch 40 will be opened and the switch 31 closed thereby placing the switch 23 in active control of the motor. Under these conditions, the valve member 14 will be moved toward open position when the temperature of the heating fluid falls below 144 degrees as evidenced by closure of the switch 23, the valve being moved toward closed position while the switch 23 remains open.

Fig. 2 shows an application of the thermostatic control system above described to a so-called blast heating system wherein the temperature at which the heated air is maintained is varied automatically in accordance with changes in the temperature of the air to be heated. In the system shown, fresh air is drawn by a power driven blower 45 through a duct 46 partially closed by a heater coil 47, the effectiveness of which is increased and decreased by movement of a damper 48 toward and away from a position completely closing a by-passage 49.

The thermostatic control for this system is identical with that shown in Fig. 1 except that the operating shaft 4 is arranged to actuate the damper 48, the latter being moved toward closed and opened positions to increase and decrease the rate of heat delivery to the air when the shading coils 11 and 10 are effective respectively. The thermostat 20 is arranged to respond to temperature changes of the heated air beyond the heater 47 while the thermostat 41 is exposed to the incoming fresh air. The thermostat 20 will be set so that its switch 24 would be closed and opened at a temperature, for example 72 degrees, most efficient for heating the rooms in mild weather as evidenced by closure of the switch 40 of the thermostat 41. The switch 23 would be closed and opened at a higher temperature of the heated air, for example 74 degrees, such as would be desired in cold weather. The latter condition would be evidenced by closure of the switch 31 of a thermostat 41.

Assuming that the weather is cold, the switch 31 of the thermostat 41 would be closed as shown thereby placing the switch 23 in active control of the motor 3. Under these conditions, the damper 48 would move toward open position under the predominating effect of the shading coils 10 while the switch 23 is maintained closed by a prevailing temperature above 74 degrees. The effectiveness of the heater 47 would be increased by movement of the damper toward closed position when the switch 23 remains open. In this way, the position of the damper would be adjusted so as to maintain the heated air at 74 degrees. Now assuming that the outside temperature rises to a value sufficient to cause closure of the switch 40, the control of the motor operator would be transferred to the switch 24 so that the damper 48 would be moved toward closed and open positions respectively in response to a fall in temperature below or a rise in temperature above the lower value at which the switch 24 operates.

From the foregoing, it will be apparent that a simple and inexpensive system has been provided for enabling two different temperatures to be maintained selectively in a controlled medium by the use of a single thermostat, and this without adjustment of the latter. The control is of a novel character such as to permit the temperatures maintained to be changed by an automatic instrumentality such as another thermostat.

I claim as my invention:

1. A control system of the character described comprising, in combination, a regulating device, an electric motor arranged to drive said device and having two windings respectively adapted when rendered effective to cause operation of the motor in opposite directions, a thermostat having two switches and a common thermal element arranged to open and close one of said switches above and below a predetermined value and to close and open the other switch above and below a substantially different value, a circuit for one of said windings including one of said switches, a circuit for the other winding including said other switch, and switching means operable selectively to interpose a resistance element in parallel with one or the other of said switches whereby to place said windings within the control of one or the other of said switches, the value of said resistance element being such that the motor will operate when one winding only is energized with the resistance element in circuit therewith or when both windings are excited with the resistance in one of them.

2. A control system of the character described comprising, in combination, a regulating device, an electric motor arranged to drive said device and having two windings respectively adapted when rendered active to cause operation of the motor in opposite directions, a sensitive control instrument having two switches and a common actuating element responsive to changes in the condition of a medium to be controlled and arranged to open and close one of said switches in response to variations in said condition relative to a predetermined value and to close and open the other switch in response to changes in said condition relative to a substantially different value, a circuit for one of said windings including one of said switches, a circuit for the other winding including said other switch, a resistance element, and switching means operable selectively to interpose said element in a short circuit through one or the other of said windings whereby to place said windings within the control of one or the other of said switches, the value of said resistance being such that the motor will operate when one winding only is energized through said resistance or when circuits through both of the windings are closed with the resistance in one of them.

3. A temperature control system comprising, in combination, a device movable in opposite directions to regulate the temperature of a medium to be controlled, an electric motor arranged to drive said device and having two windings respectively adapted when rendered active to cause operation of the motor in opposite directions, a thermostat responsive to temperature changes in said medium and having two stitches one adapted to be closed below a predetermined temperature and the other adapted to be closed above a predetermined higher temperature, said switches being arranged to close circuits through the respective windings, switching means operable selectively to interpose a resistance element in a short circuit through one or the other of said windings, and a thermostatic element responsive to temperature changes in a different medium to actuate said switching means.

4. A temperature control system comprising, in combination, a regulating device movable in opposite directions, electric motor driving means for said device including two windings respectively adapted when rendered active to cause movement of said device in opposite directions, a circuit for one of said windings having a thermostatically actuated control switch therein, a circuit for the other of said windings having an independently operable thermostatic switch therein, the resistance of said second circuit being substantially greater than that of the first circuit whereby to cause movement of said device in opposite directions in response to opening and closure of said first mentioned switch when said second switch is closed, said second switch acting in response to a predetermined temperature to render said secing circuit ineffectual.

5. A temperature control system having, in combination, a regulating device movable in opposite directions, electric driving means for actuating said device including two windings respectively adapted when rendered active to cause movement of the device in opposite directions, separate circuits for the respective windings each having a control switch therein, a sensitive control device movable in opposite directions to open and close said switches at different temperatures, and means operable selectively to establish a short circuit through one or the other of said windings, said short circuit having greater resistance than the circuits through said switches whereby to place both of said windings within the control of one or the other of said switches.

6. A system for controlling the temperature in a controlled medium by regulating the temperature in a controlling medium comprising, in combination, means for conducting the controlling medium into heat exchanging relation to the controlled medium, a device movable in opposite directions to regulate the temperature of said controlling medium, two switches responsive to temperature changes of the controlling medium, a power driven operator arranged to move said device in opposite directions in response to opening and closure of one of said switches or in response to closure and opening respectively of the other switch, and thermostatic means responsive to temperature changes of said controlled medium and operating to place one or the other of said first mentioned switches in control of said operator according to whether the temperature of the controlled medium is above or below a predetermined value.

7. A system for regulating the temperature of a medium comprising, in combination, a device movable in opposite directions to regulate the temperature of said medium, two switches responsive to temperature changes of said medium, a power driven operator arranged to move said device in opposite directions in response to opening and closure of one of said switches or closure and opening respectively of the other switch, and selectively operable means by which one or the other of said first mentioned switches may be placed in active control of said operator.

8. A temperature control system comprising, in combination, a regulating device movable in opposite directions to vary the temperature of a medium to be controlled, power driven means for actuating said device including two electric windings respectively adapted when rendered active to cause movement of said device in opposite directions, a thermostat having two switches each arranged to control a circuit through one of said windings, and means by which a resistance element may be interposed in a short circuit through one or the other of said windings whereby said windings may be rendered operative selectively by opening and closing of one of said switches.

9. A temperature control system comprising, in combination, a regulating device movable in opposite directions, electric motor driven means for actuating said device including two windings respectively adapted when rendered active to induce movement of said device in opposite directions, a sensitive control device such as a thermostat operating selectively to complete a circuit of fixed resistance through one or the other of said windings or to interrupt such circuits, and an independently operable sensitive control device selectively operable to establish a circuit of predetermined low resistance through either of said windings irrespective of the condition of said first mentioned device and to interrupt the latter circuits.

10. A temperature control system comprising, in combination, a regulating device movable in opposite directions, electric motor driven means for actuating said device including two windings respectively adapted when rendered active to induce movement of said device in opposite directions, a high resistance circuit through one of said windings arranged to be maintained closed independently of the position of said device, low resistance circuits through the respective windings each including a control switch, and a single thermostatic element arranged to close said switches at substantially different temperatures.

11. In a conditioning system, the combination of a member movable in opposite directions to regulate the flow of a conditioning medium, a power operator for reversibly actuating said member including two windings respectively tending when rendered active to cause movement of said member in opposite directions, separate main circuits for the respective windings each having a control switch therein, a sensitive condition responsive element movable in opposite directions to open and close the respective switches at different conditions of the medium to which the element responds, and means operable independently of said element to establish an auxiliary circuit of greater resistance than said main circuits through one or the other of said windings, each of said auxiliary circuits acting jointly with one of said main circuits to cause movement of said member in one direction under the predominating action of one of said windings when both of the windings are energized and acting individually to effect reversal of the movement of said member when both of the main circuits become opened by said switches.

12. In a conditioning system, the combination of a member movable in opposite directions to regulate the flow of a conditioning medium, a power operator for reversibly actuating said member, two windings controlling said operator and respectively tending when rendered active to cause movement of said member in opposite directions, separate main circuits for the respective windings each having a control switch therein, a sensitive condition responsive element movable in opposite directions to open and close said switches at different conditions of the medium to which the element responds, and selectively operable means to establish auxiliary circuits for effectively energizing one or the other of said windings to a lesser degree than the main circuits whereby said member may be moved in either direction under the predominating action of one of said windings when both of the windings are energized and in the opposite direction when said main circuits both become opened.

13. In a conditioning system, the combination of a member movable in opposite directions to regulate the flow of a conditioning medium, a power operator for reversibly actuating said member, two windings controlling said operator and respectively tending when rendered active to cause movement of said member in opposite directions, separate main circuits for the respective windings each having a control switch therein, a sensitive condition responsive element movable in opposite directions to open and close said switches at different conditions of the medium to which the element responds, selectively operable means to establish auxiliary circuits for effectively energizing one or the other of said windings to a lesser degree than the main circuits whereby said member may be moved in either direction under the predominating action of one of said windings when both of the windings are energized and in the opposite direction when said main circuits both become opened, and an independent condition responsive device for actuating said last mentioned means selectively.

14. In a conditioning system, the combination of a member movable in opposite directions to regulate the flow of a conditioning medium, a power operator for reversibly actuating said member including two windings respectively tending when rendered active to cause movement of said member in opposite directions, separate main circuits for the respective windings each having a control switch therein, a sensitive condition responsive element movable in opposite directions to open and close said switches at different conditions of the medium to which the element responds, and selectively controllable switching means operable independently of said control element to establish an auxiliary circuit through either one or the other of said windings having greater resistance than either of said main circuits.

15. In a conditioning system, the combination of a regulating member movable in opposite directions, a power operator for reversibly actuating said member including two windings respectively tending when rendered active to cause movement of said member in opposite directions, a thermostat having two switches adapted to be closed at different temperatures of an ambient medium, control circuits for governing the selective energization of said windings, and means cooperating with said switches in the control of said circuits to cause movement of said member in one direction in response to closure of one of the switches, in the opposite direction in response to opening thereof, in the last mentioned direction in response to closure of the other switch, and in the first mentioned direction in response to opening of the last mentioned switch.

GEORGE FORREST DRAKE.